March 6, 1962   J. HIMKA ET AL   3,024,062
VEHICLE BODY
Filed May 11, 1959   5 Sheets-Sheet 1
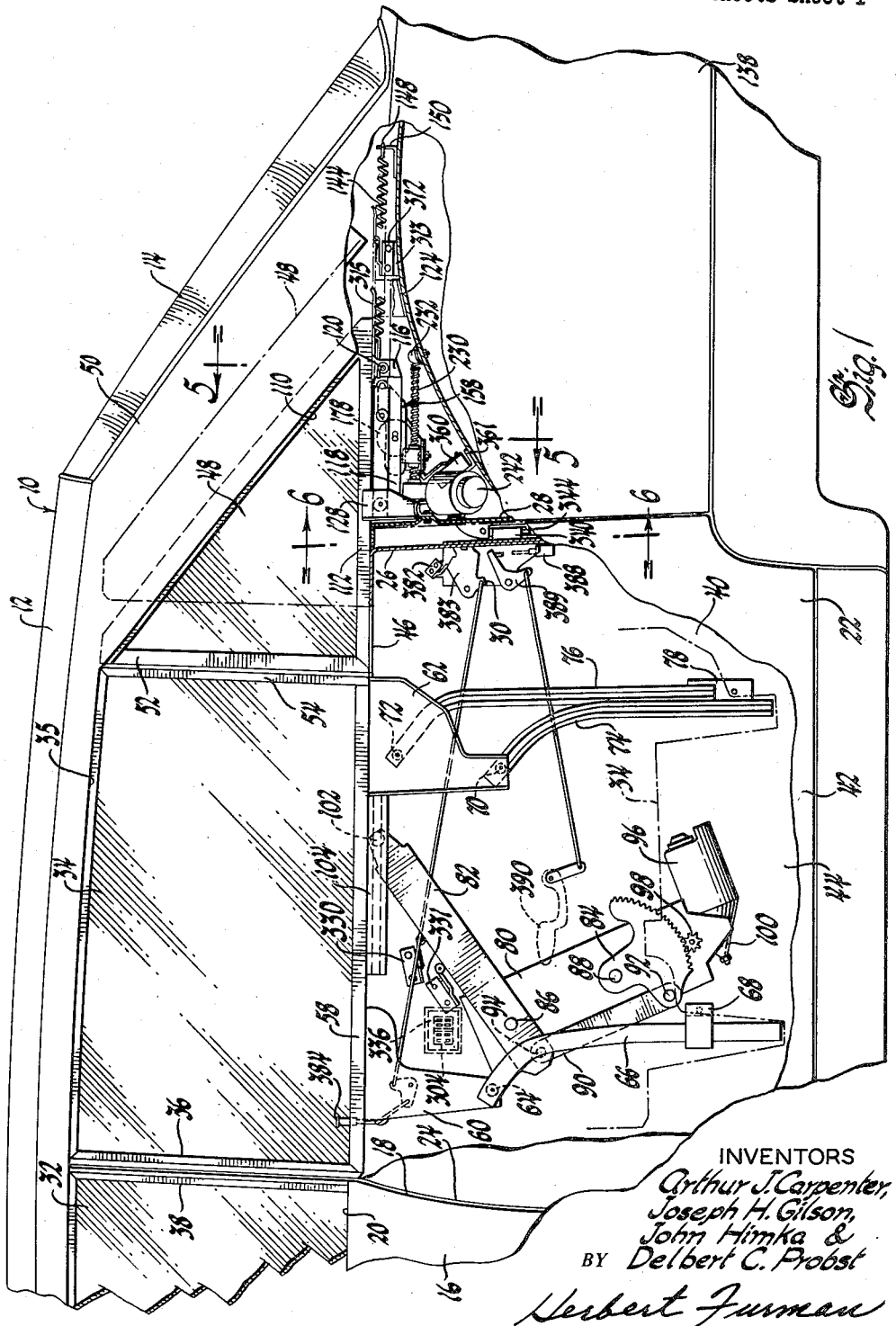
INVENTORS
Arthur J. Carpenter,
Joseph H. Gilson,
John Himka &
BY Delbert C. Probst
Herbert Furman
ATTORNEY

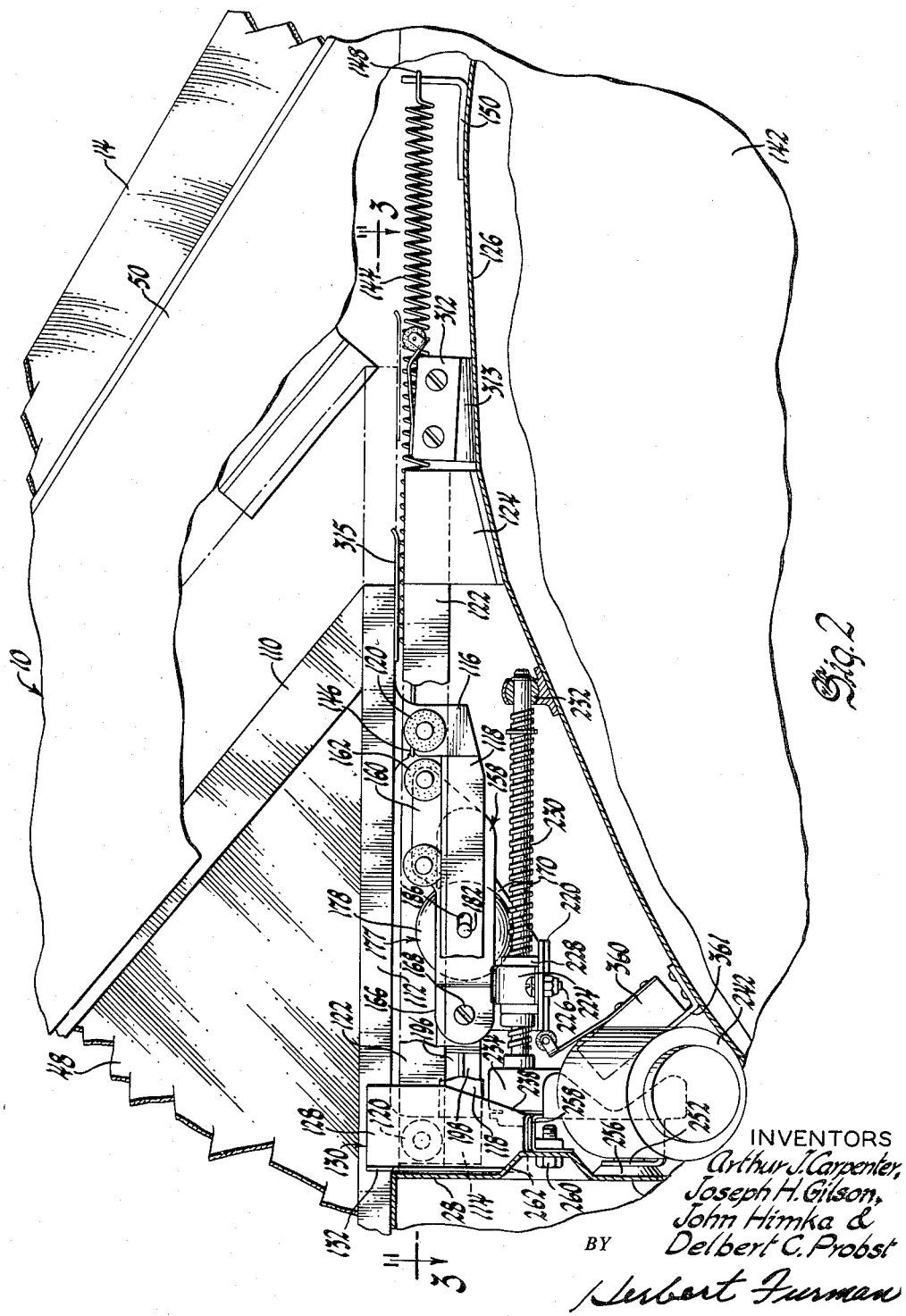

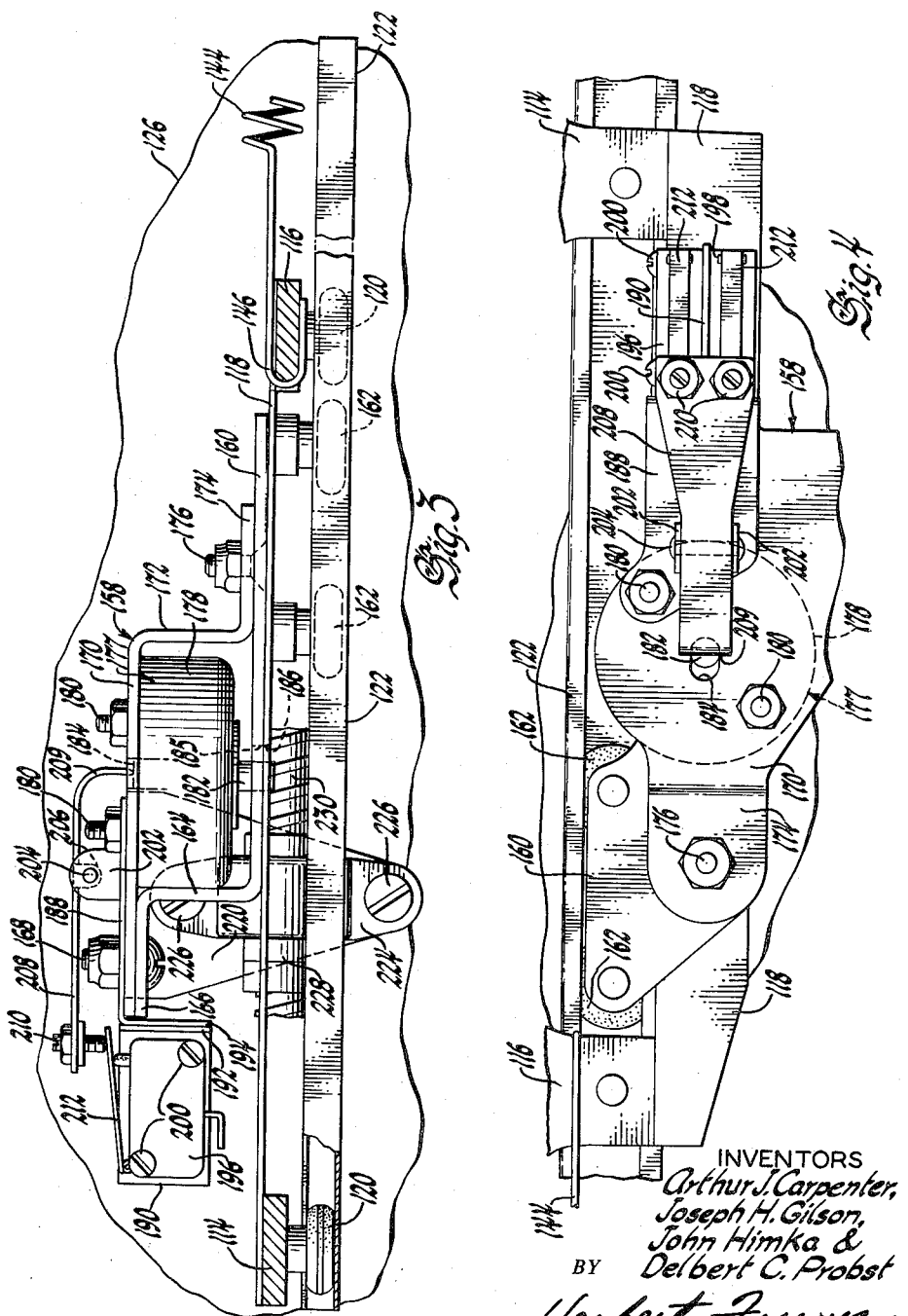

March 6, 1962

J. HIMKA ET AL 3,024,062

VEHICLE BODY

Filed May 11, 1959

INVENTORS
Arthur J. Carpenter,
Joseph H. Gilson,
John Himka &
Delbert C. Probst

BY Herbert Furman

ATTORNEY

March 6, 1962 J. HIMKA ET AL 3,024,062
VEHICLE BODY
Filed May 11, 1959 5 Sheets-Sheet 5
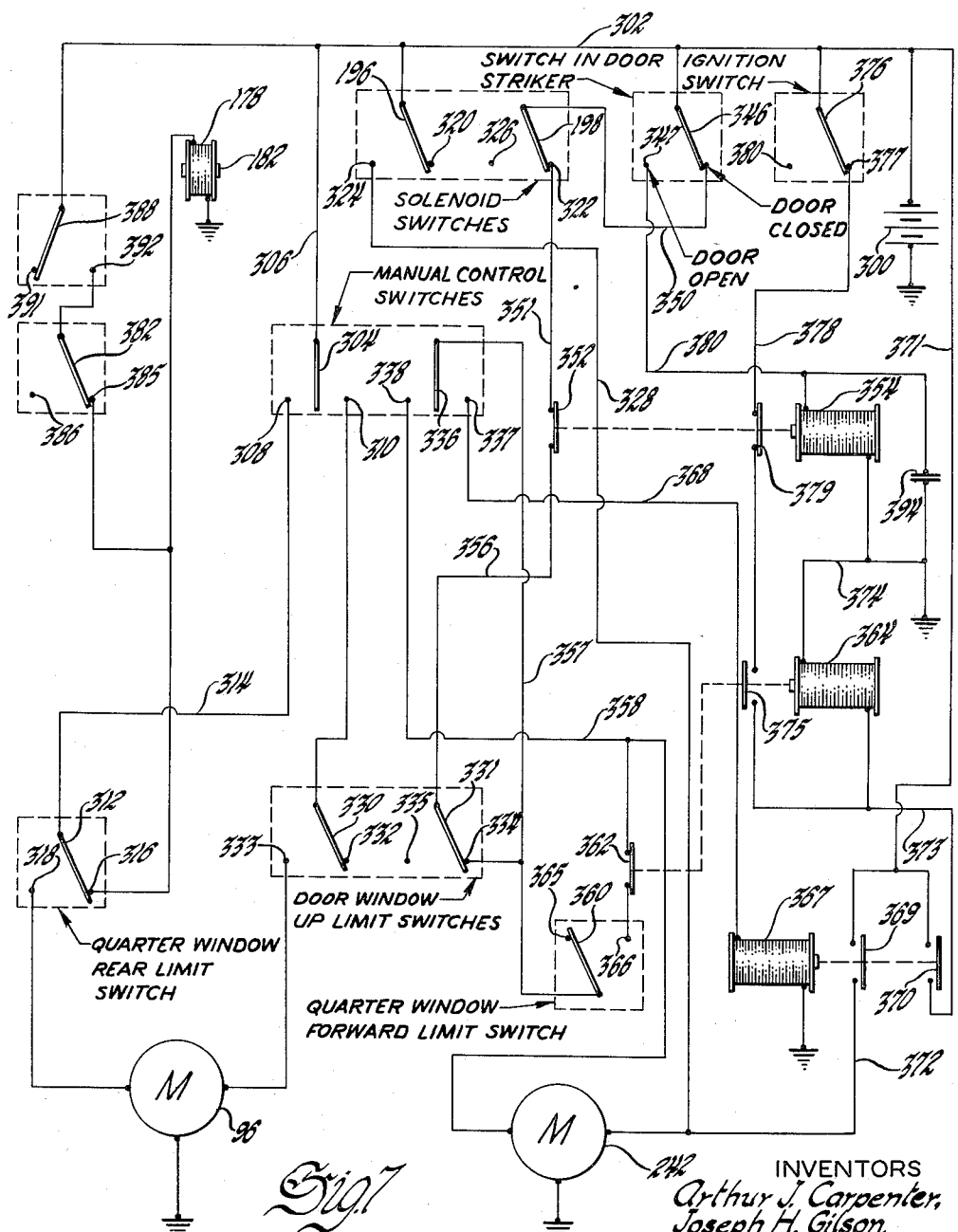
INVENTORS
Arthur J. Carpenter,
Joseph H. Gilson,
John Himka &
BY Delbert C. Probst
Herbert Furman
ATTORNEY United States Patent Office 3,024,062
Patented Mar. 6, 1962

3,024,062
VEHICLE BODY
John Himka, Farmington, Delbert C. Probst, Detroit, Joseph H. Gilson, Warren, and Arthur J. Carpenter, Royal Oak, Mich., assignors to General Motors Corporation, Detroit, Mich., a corporation of Delaware
Filed May 11, 1959, Ser. No. 812,500
6 Claims. (Cl. 296—44)

This invention relates to vehicle bodies and more particularly to vehicle body window arrangements and control means therefor.

The window arrangement of this invention is intended primarily for use in the four door hardtop sedan type of body and provides a door window and body window arrangement wherein the body window overlaps the door and projects within the door window opening so as to abut against the door window in sealing engagement therewith in the closed position of the windows. The door window moves rearwardly and downwardly when moving from closed to open position, and the body window is movable rearwardly of the door window to open or retracted position to permit this movement of the door window. Additionally, the body window is movable to open position upon movement of the door to an open position so as to provide for increased entrance room since the body window normally projects within the window opening. Further, the body window is movable between open and closed positions for ventilation purposes.

This invention provides such a window arrangement and further provides control means to coordinate the movement of the windows with respect to each other and movement of the body window with respect to the door. Thus, the body window is automatically moved to open or retracted position whenever the door window is moved from closed to any open position, and return of the body window from open to either closed or partially closed position is prevented unless the door window has first been moved to closed position. Additionally, the body window is moved to open or retracted position whenever the door is opened, remains in this position as long as the door remains open, and automatically returns to closed position when the door is closed, provided, of course, that the door window is in closed position. Further, the body window can be moved between open and closed positions or to any intermediate position therebetween for ventilation purposes as long as the door and door window are in closed position, and is automatically returned to closed position from any open position whenever the ignition switch is turned off.

The primary object of this invention is to provide a new and improved vehicle body door window and body window arrangement wherein the body window overlaps the door and projects within the door window opening to seal against the door window in the closed position of the windows. Another object of this invention is to provide an improved vehicle body door window and body window arrangement and control means therefor, wherein the door window has components of bodily movement within one portion of the door window opening when moving between open and closed positions and wherein the body window occupies this one portion of the window opening to seal against the door window in the closed position of each and is automatically moved away from the door window whenever the door window is moved between open and closed positions to allow movement of the door window within the portion of the window opening occupied by the body window. A further object of this invention is to provide an improved vehicle body door window and body window arrangement and control means therefor wherein the body window overlaps the door and projects within one portion of the door window opening to seal against the door window in the closed position of the windows and is automatically moved out of this one portion of the window opening whenever the door is opened to provide increased entrance and exit room.

These and other objects of this invention will be readily apparent from the following specification and drawings, wherein:

FIGURE 1 is a partial side elevational view of a vehicle body embodying a window arrangement and control means therefor according to this invention, with parts thereof broken away for clarity of illustration;

FIGURE 2 is an enlarged view of a portion of FIGURE 1;

FIGURE 3 is a view taken generally along the plane indicated by line 3—3 of FIGURE 2;

FIGURE 4 is a view taken along the plane indicated generally by line 4—4 of FIGURE 5;

FIGURE 7 is a circuit diagram.

Figure 5:
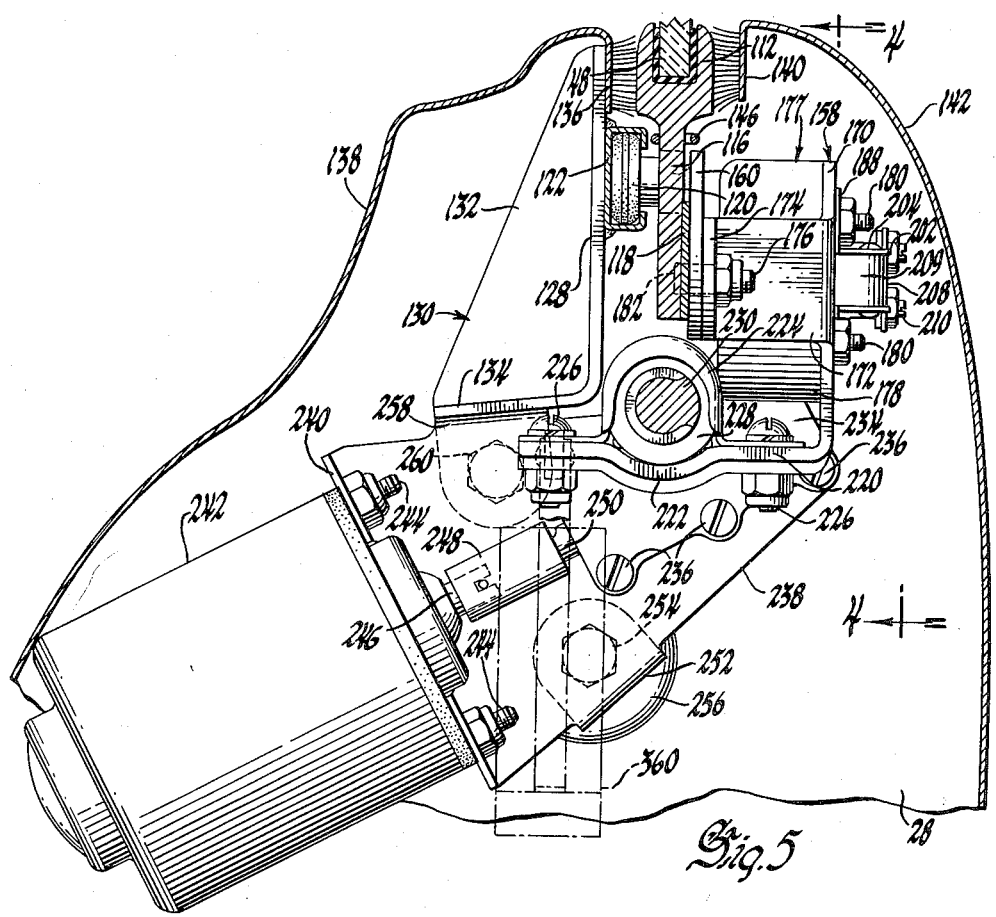
FIGURE 5 is an enlarged view taken generally along the plane indicated by line 5—5 of FIGURE 1.

Referring now particularly to FIGURE 1 of the drawings a four door hardtop type of vehicle body 10 includes a roof structure 12, a backlite 14, a front door 16 swingably mounted on the body at its forward edge, not shown, and latched at its rearward edge 18 to the usual stub pillar, not shown, which extends from the body floor pan to the belt line 20 of the body, and a rear door 22 swingably mounted on the stub pillar at its forward edge 24 and latched at its rearward edge wall 26 to a rear quarter body pillar 28 by suitable latching means 30, such as shown in Patent No. 2,849,251. Since body 10 is of the four-door hardtop type, there are no front and rear door window frames provided for either the front door window 32 or the rear door window 34 above the belt line 20 of the body and the windows seal against the body header 35 in the closed position thereof. Additionally, the forward edge portion 36 of the rear door window 34 overlaps the stub pillar of the body to seal against the rearward edge portion 38 of the front door window 32. Since the forward edge portion 36 of the rear door window overlaps the stub pillar of the body, the window must be moved both rearwardly and downwardly in order to be moved out of overlapping relationship to the stub pillar and to an open position within the window well 40 provided by the door outer panel 42 and the door inner panel 44. The upper edge portions of the door inner and outer panels are spaced apart to provide the entrance 46 to the well. It will be noted that the window 34 closes only the forward portion of the entrance to the well and occupies only the forward portion of the door window opening in the closed position of the window.

A rear quarter window 48, coplanar with window 34, is slidably mounted on the body in a manner to be described for movement between a closed position as shown in full lines and an open or retracted position as shown in dot-dash lines wherein the window is partially retracted within the rear roof pillar structure 50 of the body. Additionally, it will be noted that window 48 overlaps the rear edge portion of the door 22 to occupy the rear portion of the door window opening and close the rear portion of the entrance to well 40 when the window is in closed position whereby the forward edge portion 52 of the window seals against the rearward edge portion 54 of window 34. Since window 34 must be moved rearwardly and downwardly in order to be moved to an open position within well 40, window 48 must be moved to its open or retracted position to permit this movement of the door window. Further, it is desirable that window 48 remain in its retracted or open position as long as window 34 is in any position but fully closed position in order to prevent damage to the windows by accidental movement of either one.

Since window 48 occupies the rear portion of the door window opening in the closed position of the window, it is desirable that the window be moved to an open or retracted position when the door is opened to provide increased entrance and exit room for the passengers and remain in this retracted or open position as long as the door is in an open position.

It is also desirable that window 48 be able to be moved between opened and closed positions at the will of the operator for ventilation purposes. This movement, of course, being restricted by the requirements that the window remain in fully open position as long as the door or door window are in any position but fully closed position.

In order to coordinate the various movements of the door window and door with the quarter window, this invention provides a control means which permits various sequences of movement of the door window and door relative to the quarter window, permits various sequences of movement of the quarter window relative to the door and door window, and prevents any possible interference to these various movements whereby all are coordinated.

Referring now particularly to FIGURE 1 of the drawings the operating means for the door window 34 will first be described. The lower window frame member 58 of window 34 includes front and rear depending brackets 60 and 62, respectively. Bracket 60 pivotally mounts a roller 64 which is slidably and rotatably received within a forward guide channel 66 mounted on the door outer panel 42 by bracket 68. As can be seen, the shape of channel 66 is such as to guide the forward edge portion 36 of window 34 in a rearward and downward path when the window is moved to an open position within the well 40. Bracket 62 pivotally mounts a pair of rollers 70 and 72 received within respective rear guide channels 74 and 76 mounted on the door inner panel by bracket 78. The shape of the channels 74 and 76 is generally complementary to that of channel 66 and guides the rearward edge portion 54 of the window 34 in a rearward and downward path upon opening movement of the window whereby the rearward portion of the window initially moves downwardly and rearwardly within entrance 46 slightly ahead of the forward portion of the window so that the window can back away from overlapping relationship with the stub pillar and thereafter move generally vertically to an open position within the well 40 indicated schematically by dot-dash lines. It can be seen that window 34 must move within the rear portion of entrance 46 closed by window 48 in order to move to open position.

The operating means for the window 34 further includes an electrically operated window regulator linkage arrangement which will now be described. A back plate 80 is suitably mounted on the door inner panel, and a window regulator lift arm 82 and a sector 84 are pivotally mounted thereon at 86 and 88, respectively. The lift arm and sector are operatively interconnected by a shiftable link 90, pivoted to the sector at 92 and to the lift arm at 94. The sector meshes with a pinion 98 driven by a reversible shunt wound electric motor 96 through a suitable gear reduction unit 100, as is common in electrically operated window regulators. The upper end of the lift arm pivotally mounts a roller 102 which is slidably and pivotally received within a cam channel 104 secured to frame member 58 whereby the lift arm moves the window between open and closed positions, with this movement being guided by the front guide channel 66 and the rear guide channels 74 and 76.

Referring now particularly to FIGURES 1 through 5 of the drawings, the operating means for the window 48 will be described. Window 48 is mounted within a suitable frame 110 which includes a lower frame member 112 provided with forward and rearward depending ears 114 and 116, respectively, interconnected by a bar 118. Ears 114 and 116 pivotally mount rollers 120 which are pivotally and slidably received within an inwardly opening cam channel 122. The rearward end of the cam channel is mounted on the body by an angle bracket 124 which is welded to the base wall of the cam channel and to the wheel house 126 of the body. As best shown in FIGURE 5 of the drawings, the forward end of the base wall of the cam channel is welded or otherwise secured to a flange 128 of a bracket 130. Flange 128 is integral with flanges 132 and 134 of the bracket, and the upper edge portion of flange 128 is welded or otherwise secured to an inwardly extending flange 136 of the rear quarter outer body panel 138 to mount bracket 130 and the forward end of cam channel 122 on the body. Flange 136 is located in spaced opposed relationship to a flange 140 of the rear quarter inner body panel 142 and defines therewith a slot for slidably receiving the frame member 112 of window 48.

As best shown in FIGURES 1 and 2 of the drawings a tension spring 144 has the forward end 146 thereof hooked over ear 116 of frame member 112 and the rearward end 148 thereof hooked over a bracket 150 welded to the wheel house 126. Thus, it can be seen that window 48 is continually biased in a rearward direction to its retracted or open position by means of the spring 144 and that the window will automatically move to this position unless held in an intermediate or fully closed position. A holding means, which will now be described, holds the window in an intermediate or fully closed position and instantaneously releases the window so that it can be moved to its retracted or open position by spring 144 whenever the door window 34 or door 22 is moved to an open position. Further, this holding means is supported by a carriage assembly which is power operated to move the window 48 between its open and closed positions or to any intermediate position therebetween whenever the holding means is not released from the window.

Referring now particularly to FIGURES 2 through 4 of the drawings, the carriage assembly 158 will first be described. A support plate 160 pivotally mounts a pair of rollers 162 which are received within cam channel 122 and are located between the rollers 120 of window 48 in all positions of the window. Plate 160 includes an integral pair of lateral flanges 164 and 166, with flange 166 being bolted at 168 to a plate 170. Plate 170 includes an integral pair of lateral flanges 172 and 174, with flange 174 being bolted at 176 to the plate 160. The holding means 177 generally comprises a linear solenoid 178 which fits between plates 160 and 170 and is bolted at 180 to plate 170. The armature 182 of the solenoid can move alternately inwardly and outwardly through plates 170 and 160 through slots 184 and 185 provided therein.

Armature 182 is spring biased outwardly of the opening 185 in plate 160 and is normally received within a slot 186 in bar 118 to hold window 48 in its forward or closed position against the action of spring 144. It will further be noted that the bar 118 moves in face to face relationship with plate 160 whereby armature 182 cannot be received within slot 186 of the bar unless the slot 185 is aligned therewith. Thus, the solenoid armature 182 provides the holding means for window 48 and is also the sole connecting means between the carriage assembly 158 and the window 48.

A bracket 188 is secured to plate 170 by bolts 168 and 180. A switch support plate 190 includes a lateral flange 192 welded to a flange 194 of bracket 188, FIGURE 3. Plate 190 mounts upper and lower switches 196 and 198, respectively, secured thereto at 200. Bracket 188 includes a pair of laterally extending ears 202 which are pivoted at 204 to laterally extending ears 206 of a rocker bar 208 so as to pivotally mount the rocker bar on plate 170. One laterally bent end 209 of the rocker bar is located over the slot 184 in plate 170 whereby the rocker bar will be shifted counterclockwise, as viewed in FIGURE 3, whenever solenoid 178 is energized to retract armature 182 from its normal position within slots 185 and 186 and move the armature outwardly of slot 184 in plate 170. The other end of the rocker bar 208 mounts a pair of adjustable screws 210 which normally engage the operating arms 212 of switches 196 and 198. It can be seen that whenever the rocker bar 208 is moved counterclockwise as viewed in FIGURE 3, upon energization of solenoid 78, the rocker bar will thereupon operate both switches 196 and 198. As was previously mentioned, the solenoid armature 182 cannot be moved outwardly of slot 185 unless this slot is aligned with slot 186 of bar 118. Thus, whenever slots 185 and 186 are not aligned, rocker bar 208 will operate the switches 196 and 198 regardless of whether the solenoid 178 is or is not energized.

As best shown in FIGURE 5 of the drawings, plate 170 includes a laterally extending flange 220 which extends outwardly of the body underneath plate 160 and cam channel 122 and is provided with an arcuate bearing seat 222. An arcuate bearing cover 224 is bolted to flange 220 at 226 and holds an internally threaded nut 228 in tight engagement with seat 222 to thereby hold the nut against rotational movement. Nut 228 threadedly receives a screw shaft 230 which extends generally longitudinally of the body as can be seen in FIGURES 2 and 3. As best shown in FIGURE 2 of the drawings, the rearward end of the screw shaft is journalled in a spherical type bearing block 232 secured to the wheel house 126 of the body. The forward end of the screw shaft is operatively secured to a reduction gear unit 234 of common type which is bolted at 236 to a bracket 238. Bracket 238 includes a laterally extending flange 240 and a reversible shunt wound electric motor 242 is bolted thereto at 244. The armature shaft 246 of the motor is coupled at 248 to the input shaft 250 of the reduction gear unit 234 such that operation of the motor will drive the reduction gear unit which in turn will rotate the screw shaft 230. Bracket 238 includes a return bent ear 252 bolted at 254 to an embossment 256 of pillar 28 and another return bent ear 258 bolted at 260 to embossment 262 of pillar 28 to thereby mount the bracket on the body. Flange 134 of bracket 130 is wlded to the return bent ear 258 of bracket 238 to additionally support bracket 130 on the body.

It can be seen that when window 48 is in a forward or closed position, the solenoid armature 182 holds the window in this position against the action of spring 144 by being received within slots 185 and 186. Upon energization of the solenoid 178 to retract armature 182, spring 144 will instantaneously move the window 48 to its open or retracted position while switches 196 and 198 will be energized by the rocker bar 208 and will remain energized since bar 118 will prevent movement of armature 182 into slot 186 until slot 186 is returned into alignment with slot 185. As will be apparent from a further description of the invention, energization of switches 196 and 198 will cause motor 242 to become energized so as to rotate the screw shaft 230 to move the carriage assembly 158 rearwardly of the body until slot 186 is moved into alignment with slot 185 so that armature 182 can be moved outwardly of the body into the slot 186 to thereupon deenergize the switches 196 and 198 and the motor 242.

Further, it can be seen that, subject to the restrictions placed upon movement of window 48 by the position of door 22 and window 34, energization of motor 242 without energization of the solenoid 178 can move window 48 to various positions by movement of the carriage assembly 158 and simultaneous movement of the window 48 by engagement of the solenoid armature 182 in slot 186. Likewise, when the window 48 has been moved to an open or retracted position by the spring 144 and the carriage assembly 158 has been moved rearwardly until it is again connected to the window 34 by the solenoid armature 182 and slot 186, subsequent energization of the motor 242 can move the window 48 to a forward or closed position.

Referring now particularly to FIGURE 7 of the drawings, the control means and operation thereof will be particularly described in conjunction with various sequences of movement of the window 34 and door 22 relative to the window 48 and likewise various sequences of movement of the window 48 relative to the door 22 and the window 34. FIGURE 7 shows the condition of the circuit when windows 34 and 48 and door 22 are in closed position and the ignition switch of the vehicle is in "on" position.

Assume now the conditions that the ignition switch is "on" or "off," door 22 is closed, windows 34 and 48 are closed, and that the operator desires to open window 34. As previously mentioned, whenever window 34 is moved to an open position, window 48 is moved to its open or retracted position and will remain in this position unless window 34 is returned to its fully closed position. This will now be described with principal reference to FIGURE 7 of the drawings.

A battery 300 is connected between ground and a bus bar 302. The door window manual control switch 304, which may be mounted on the door inner panel as indicated schematically in FIGURE 1, is connected to the bus bar 302 by a conductor 306 and can be closed to either of a pair of contacts 308 or 310. Closure of switch 304 to contact 308 controls movement of window 34 to an open position and closure of the switch to contact 310 controls movement of the window to a closed position. Contact 308 is connected to a quarter window rear limit switch 312 by a conductor 314. As best shown in FIGURE 2 of the drawings, switch 312 is mounted on the wheel house 126 by an angle bracket 313 and is operated by a shoe 315 secured to the rearward edge portion of frame member 112. Normally switch 312 is closed to contact 316 when the window 48 is in any position other than open or retracted position and becomes closed to contact 318 when window 48 is in its open or retracted position by engagement of the shoe 315 with the spring arm of the switch. Contact 318 is connected to ground across the armature and downward winding of motor 96 and contact 316 is connected to ground across solenoid 178.

If switch 304 is closed to contact 308, it can be seen that a circuit will be completed from the battery 300 to ground across contact 316 of switch 312 and solenoid 178 to energize the solenoid whereby the armature 182 thereof will be drawn out of slot 186 in bar 118 so that spring 144 will immediately move the window 48 rearwardly to its open or retracted position. As soon as the window reaches open position, switch 312 becomes closed to contact 318 to complete a circuit from the battery to ground across motor 96 so that the window 34 will be moved to its open position.

It will be remembered that the solenoid armature 182 swings the rocker bar 208 to energize switches 196 and 198 whenever the solenoid 178 is energized. Switch 196 is normally closed to contact 320 and switch 198 is normally closed to contact 322 whenever solenoid 178 is not energized and the solenoid armature 182 is received within slot 186. Since the bar 118 prevents the solenoid armature from returning to its deenergized position whenever slot 185 is out of alignment with slot 186, switches 196 and 198 will be closed to contacts 324 and 326 thereof upon rearward movement of the window 48 to its open or retracted position as immediately described hereinbefore. A circuit will then be completed from bus bar 302 to ground across the armature and rearward field winding of motor 242 by contact 324 of switch 196 and conductor 328 so that motor 242 will be energized to rotate shaft 230. Rotation of the shaft 230 in the appropriate direction will cause the nut 228 to be moved rearwardly therealong or to the right as viewed in FIGURE 2 so that the carriage assembly 158 will be moved as bar 118 slides relative to the solenoid armature 182. As soon as slot 186 moves into alignment with slot 185, the armature can move outwardly through slot 186 so that switches 196 and 198 will be deenergized or returned into engagement with the contacts 320 and 322 thereof. Opening of switch 196 from the contact 324 deenergizes motor 242.

It will be remembered that the window 48 remains in its open or retracted position as long as the window 34 is in any position other than fully closed position and this will now be described. Upon reference to FIGURE 1 of the drawings, it will be noted that the lift arm 82 of window 34 engages the spring arms of a pair of limit switches 330 and 331 when the window is in closed position. As shown in FIGURE 7 of the drawings, switch 330 is closed to contact 332 when window 34 is in closed position and will become closed to contact 333 when the window is in any position other than this position. Likewise, switch 331 is closed to contact 334 thereof when window 34 is in closed position and will become closed to contact 335 thereof when the window is in any position other than this position.

The manual control switch 336 for window 48 may be conveniently mounted on the door inner panel as indicated schematically in FIGURE 1 and may be closed to either contact 337 or 338 thereof. Contact 338 controls forward movement of the window 48 to its closed position and contact 337 controls rearward movement of the window to its open or retracted position.

Figure 6:
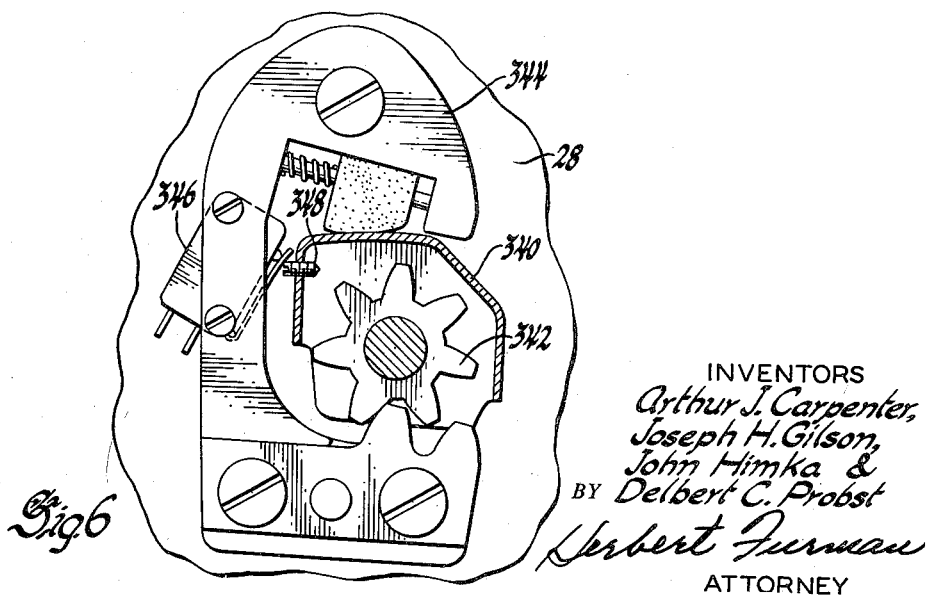
FIGURE 6 is an enlarged view taken generally along the plane indicated by line 6—6 of FIGURE 1.

Referring now particularly to FIGURES 1 and 6 of the drawings, the latch mechanism 30 includes a bolt housing 340 which supports the gear type bolt 342 of the latch mechanism and is received within the striker 344 on pillar 28 when the door is in a closed and latched position. Striker 344 mounts a switch 346, the spring arm of which is adapted to be engaged by an adjustable screw 348 on housing 340 whenever the door is in a closed latched position. As shown in FIGURE 7 of the drawings, switch 346 is connected to the bus bar 302 and is closed to contact 347 when the door is in an open unlatched position and is closed to contact 348 when the door is in a closed latched position. Contact 348 is connected to the switch 198 by a conductor 350.

Thus, when the door is in a closed latched position and windows 34 and 48 are in open position, an open circuit to switch 331 from conductor 302 occurs across switch 346, contact 348, conductor 350, switch 198, contact 322, conductor 351, armature 352 of relay 354, and conductor 356. Since the feed to switch 336 is from contact 334 of switch 331 and conductor 357, closure of the switch 336 to contact 338 cannot complete any circuit to ground across the armature and forward field winding of motor 242 by conductor 358. Thus, as long as window 34 is in any position other than closed position such that switch 331 is closed to contact 335, window 48 cannot be moved to any position forward of its open or retracted position.

Assume now that the operator closes switch 304 to contact 310 to move the window 34 to closed position. A circuit will be completed to ground across the armature and upward field winding of motor 96 from the bus bar 302, conductor 306, switch 304, contact 310, switch 330, and contact 333 thereof. As soon as the window reaches a closed position, engagement of the lift arm 82 with switches 330 and 331 will close the switches to contacts 332 and 334. This will operate to return window 48 forwardly to its closed position which will now be described. Closure of switch 331 to contact 334 completes a circuit from bus bar 302 across switches 346 and 198 and armature 352 of relay 354 to conductor 357. The circuit from conductor 357 to conductor 358 and thereafter to ground across the armature and forward field winding of motor 242 is controlled by a quarter window forward limit switch 360 and the armature 362 of relay 364. As best shown in FIGURE 2 of the drawings, switch 360 is secured to bracket 361 mounted on wheelhouse 126 and the spring arm thereof is engaged by flange 220 of plate 170 to close the switch to contact 365 thereof when the window 48 is in its forward or closed position. As soon as the motor 242 is energized to move the carriage 177 rearwardly, switch 360 becomes closed to contact 366 thereof. Thus, when the window 48 is in its open or retracted position, switch 360 will be closed to contact 366 to complete the circuit to ground across motor 242 to move carriage 158 and window 48 forwardly to closed position as soon as window 34 moves to closed position. As soon as the window 48 reaches its closed position, switch 360 becomes closed to contact 365 by flange 220 to deenergize motor 242.

Assume now that the ignition is "on," door 22 and windows 34 and 48 are in closed position, and that the operator desires to move window 48 to a partially open position for ventilation purposes. Closure of switch 336 to contact 337 completes a circuit from this contact to ground across relay 367 and conductor 368 to energize the relay and close the armatures 369 and 370 thereof. Closure of armature 369 completes a circuit from bus bar 302 across the armature and rearward field winding of motor 242 by way of conductors 371 and 372 to energize the motor and thereby move the carriage 158 and the window to whatever position desired. Closure of armature 370 completes a circuit to ground across relay 364 by conductors 373 and 374 to energize the relay and open the armature 362 thereof and close the armature 375 thereof. It will be remembered that switch 360 becomes closed to the contact 366 thereof whenever window 48 is in any position other than a fully closed position. Thus, as soon as the window 48 is moved rearwardly to a partially open position, it can be seen that a circuit could be completed from conductor 357 to ground across the armature and forward field winding of motor 242 if armature 362 were closed so that both field windings of motor 242 would be energized and the motor would stall. However, since relay 364 opens the armature no such circuit is completed.

It will further be noted that closure of armature 375 of relay 364 energizes a back feed circuit across the relay from bus bar 302 to ground across the ignition switch 376 the "on" contact 377 thereof, conductor 378, armature 379 of relay 354, and armature 375 of relay 364. The reason for this back feed circuit is that as soon as window 48 has reached the desired open position, the operator will release switch 336 to deenergize relay 367 and thereby open armature 370 to open the circuit across relay 364. If the relay 364 were thereupon deenergized, armature 362 of the relay would again become closed and since switch 360 would be closed to contact 366 thereof window 48 would immediately return to its initial starting or fully closed position so as to counteract the desire of the operator for ventilation. Once relay 364 has become energized, the relay will remain energized until the ignition switch is moved into engagement with the "off" contact 380 thereof, and window 48 will thereupon be automatically moved to a fully closed position since relay 364 will become deenergized so that the armature 362 thereof will become closed.

Likewise it can be seen that closure of switch 336 to contact 338 to move the window 48 from any partially open position to a fully closed position completes a circuit across the armature and forward field winding of motor 242 by conductor 358 to thereby move the window to this position.

Assume now that the ignition switch is "on" or "off," windows 34 and 48 are in closed position, and that door 22 is opened. As best shown in FIGURE 1 of the drawings a switch 382 is controlled by a lever 383 of latch mechanism 30 which is operated by the inside push button 384 of the mechanism to lock the mechanism against operation by an outside push button, not shown, of the type shown in Patent No. 2,862,753 Priestman. As shown in FIGURE 7 of the drawings, switch 382 is closed to contact 385 whenever the door is in closed position and the push button is not operated to lock the mechanism 30 against outside operation by the outside push button. Operation of the inside push button closes the switch 382 to contact 386 upon swinging movement of lever 383. Further, as shown in FIGURE 1 of the drawings, another switch 388 is operated by either a lever 389 connected by the inside operating handle 390, or by the outside push button. As shown in FIGURE 7, switch 388 is closed to contact 391 when neither handle 390 nor the outside push button is operated, and is closed to contact 392 when either the handle 390 or the outside push button is operated to unlatch mechanism 30 and open the door 22. Contact 392 is connected to switch 382.

It can be seen that if either the inside handle 390 or the outside push button is operated to release latch mechanism 30 and open the door, a circuit will be completed to ground across switches 388 and 382 and solenoid 178 to energize the solenoid and retract the armature 182 thereof to allow spring 144 to move the window 48 to an open or retracted position. Movement of the window to this position will close switch 196 to the contact 324 thereof and energize the armature and rearward field winding of motor 242 so that carriage 158 will be moved rearwardly until slot 186 becomes aligned with slot 185 to thereby open switch 196 to contact 324 thereof and stop the motor 242. Further it will be noted that switch 346 will become closed to contact 347 to complete a circuit to ground across relay 354 and condenser 394 to charge the condenser and energize the relay to open armatures 352 and 379 thereof. Since switch 198 will become closed to contact 322 when carriage 158 has been moved rearwardly and has been again connected to window 48 by the solenoid armature 182, the circuit from contact 348 of switch 346 to ground across the armature and forward field winding of motor 242 will be placed in readiness to return the window to a fully closed position as soon as the door 22 is closed so that switch 346 will be moved into engagement with contact 348. However, in order to insure that the door will be in a fully closed and latched position before window 48 is moved forwardly to a closed position, the condenser 394 provides a time delay for relay 354 whereby deenergization of the relay will be delayed and likewise closure of armatures 352 and 379 thereof will be delayed. Since window 48 cannot be moved forwardly until armature 352 is closed, forward movement of the window is delayed to insure that the door will be in a fully closed and latched position.

It is believed obvious from the foregoing description that if the window 48 is in any partially open position, it will likewise be moved rearwardly to an open or retracted position when solenoid 178 is energized, and that the window will be returned to a fully closed position when the door is closed since opening of armature 379 of relay 354 will deenergize relay 364 and close the armature 362 thereof.

Switch 382 provides a safety feature to prevent movement of window 48 to a open position if the inside push button is operated to lock the latch mechanism, since switch 388 is operated by the outside push button regardless of whether the latch mechanism is in a latched or an unlatched position.

Thus, this invention provides a new and improved vehicle body window arrangement and control means therefor.

What is claimed is:

1. The combination comprising, a vehicle body having a body header, a door mounted on said body for movement to open and closed positions and including a door well having an entrance thereto, the upper edge portion of said door being spaced from said header to define a window opening therewith, a door window mounted on said door for movement into and out of said well through said entrance between open and closed positions, said door window closing one portion of said entrance and said opening in the closed position thereof, means for moving said door window between said positions thereof, a body window mounted on said body for movement between open and closed positions, said body window overlapping said door to close the other portion of the entrance to said well and said opening in the closed position thereof and being located out of overlapping relationship to said door to open the other portion of the entrance to said well and said window opening in the open position thereof, operating means for moving said body window between said positions thereof, and control means responsive to the position of said door and of said door window for controlling operation of said operating means.

2. The combination comprising, a vehicle body having a window opening therein, a door mounted on said body for movement between open and closed positions, a window mounted on said body for movement between open and closed positions with respect to said window opening, means biasing said window to one of said positions thereof, means mounted on said body for movement with respect thereto and being engageable with said window for holding said window in said other position thereof against said biasing means, control means responsive to movement of said door for disengaging said movable means from said window to allow said biasing means to move said window to said one position thereof, and means responsive to movement of said window from said other to said one position thereof for moving said movable means relative to said body and into engagement with said window in said one position thereof.

3. The combination comprising, a vehicle body having a window opening therein, a door mounted on said body for movement between open and closed positions, a window mounted on said body for movement between open and closed positions with respect to said window opening, means biasing said window to said open position thereof, means mounted on said body for movement with respect thereto and being engageable with said window in said closed position thereof for holding said window in the said closed position against the action of said biasing means, control means responsive to opening movement of said door for disengaging said operating means from said window to allow said biasing means to move said window to said open position thereof, means responsive to movement of said window from said closed to said open position thereof for moving said movable means relative to said body and into engagement with said window in said open position thereof, and means responsive to closing movement of said door for moving said movable means relative to said body to move said window to said closed position thereof.

4. The combination comprising, a vehicle body having a window opening therein, a door mounted on said body for movement between open and closed positions, a window mounted on said body for movement between open and closed positions with respect to said window opening, means biasing said window to said open position thereof, means mounted on said body for movement relative thereto and being engageable with said window in said closed position thereof for holding said window in said closed position against the action of said biasing means, control means responsive to opening movement of said door for disengaging said movable means from said window to allow said biasing means to move said window to said open position thereof, means responsive to movement of said window from said closed to said open position thereof for moving said movable means relative to said body and into engagement with said window in said open position thereof, means responsive to closing movement of said door for moving said movable means relative to said body to move said window to said closed position thereof, and manual control means responsive to the position of said door for moving said movable means relative to said body while in engagement with said window to thereby move said window to an open position thereof for ventilation purposes.

5. The combination comprising, a vehicle body having a body header and power plant control means, a door mounted on said body for movement to open and closed positions and including a door well having an entrance thereto, the upper edge portion of said door being spaced from said header to define a window opening therewith, a door window mounted on said door for movement into and out of said well through said entrance between open and closed positions, said door window closing one portion of said entrance and said opening in the closed position thereof, means for moving said door window between said positions thereof, a body window mounted on said body for movement between open and closed positions, said body window overlapping said door to close the other portion of the entrance to said well and said opening in the closed position thereof and being located out of overlapping relationship to said door to open the other portion of the entrance to said well and said window opening in the open position thereof, operating means for moving said body window between said positions thereof, and control means responsive to said power plant control means for moving said body window from said open position thereof to said closed position.

6. The combination comprising, a vehicle body having a body header, a door mounted on said body for movement to open and closed positions and including a door well having an entrance thereto, the upper edge portion of said door being spaced from said header to define a window opening therewith, a door window mounted on said door for movement into and out of said well through said entrance between open and closed positions, said door window closing one portion of said entrance and opening in the closed position thereof, means for moving said door window between said positions thereof, a body window mounted on said body for movement between open and closed positions, said body window overlapping said door to close the other portion of the entrance to said well and said opening in the closed position thereof and being located out of overlapping relationship to said door to open the other portion of the entrance to said well and said window opening in the open position thereof, operating means for moving said body window between said positions thereof, and control means selectively and alternately responsive to movement of said door to open position or movement of said door window to open position for controlling operation of said operating means.

References Cited in the file of this patent
UNITED STATES PATENTS

| | | |
|---|---|---|
| 1,826,922 | Carr | Oct. 13, 1931 |
| 2,418,031 | Horton | Mar. 25, 1947 |
| 2,669,450 | Pfeiffer | Feb. 16, 1954 |
| 2,745,662 | McDougall | May 15, 1956 |
| 2,746,747 | Lautenbach | May 22, 1956 |
| 2,795,455 | Earl | June 11, 1957 |
| 2,828,999 | Schamel | Apr. 1, 1958 |
| 2,834,420 | Guess | May 13, 1958 |